United States Patent
Saito et al.

(10) Patent No.: US 8,472,419 B2
(45) Date of Patent: Jun. 25, 2013

(54) RADIO COMMUNICATION SYSTEM, RADIO COMMUNICATION DEVICE, RADIO COMMUNICATION METHOD, AND PROGRAM

(75) Inventors: Erika Saito, Tokyo (JP); Tomoya Yamaura, Tokyo (JP); Katsutoshi Itoh, Tokyo (JP); Masahiko Naito, Tokyo (JP); Natsuki Itaya, Tokyo (JP); Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 270 days.

(21) Appl. No.: 12/939,300

(22) Filed: Nov. 4, 2010

(65) Prior Publication Data

US 2011/0116425 A1 May 19, 2011

(30) Foreign Application Priority Data

Nov. 13, 2009 (JP) ................. P2009-260294

(51) Int. Cl.
*H04W 4/00* (2009.01)
(52) U.S. Cl.
USPC .......................................... 370/338; 370/310
(58) Field of Classification Search
USPC ................................. 370/310, 338
See application file for complete search history.

(56) References Cited

U.S. PATENT DOCUMENTS

| 6,842,460 B1 * | 1/2005 | Olkkonen et al. ............ 370/465 |
| 2007/0109962 A1 * | 5/2007 | Leng et al. .................... 370/229 |
| 2009/0291644 A1 * | 11/2009 | Suwa et al. .................... 455/77 |

FOREIGN PATENT DOCUMENTS

| JP | 2006-254209 | 9/2006 |
| JP | 2007-096917 | 4/2007 |
| JP | 2008-283590 | 11/2008 |
| JP | 2009-500969 | 1/2009 |
| WO | WO 03/003610 | 1/2003 |
| WO | WO 2005/0088913 | 9/2005 |

OTHER PUBLICATIONS

Apr. 30, 2013, JPO Communication issued in related application No. JP 2009-260294.

* cited by examiner

*Primary Examiner* — Brian D Nguyen
(74) *Attorney, Agent, or Firm* — Sherr & Jiang, PLLC

(57) ABSTRACT

Provided is a radio communication system including a first radio communication device, and a second radio communication device that communicates with a radio communication device operating as a master unit and being connected, wherein the second radio communication device includes a communication unit that communicates with the radio communication device being connected, and a control unit that controls the communication unit to send a response packet to the first radio communication device when a response request packet broadcasted from the first radio communication device is received by the communication unit.

14 Claims, 12 Drawing Sheets

RADIO COMMUNICATION SYSTEM, RADIO COMMUNICATION DEVICE, RADIO COMMUNICATION METHOD, AND PROGRAM

BACKGROUND OF THE INVENTION

1. Field of the Invention

The present invention relates to a radio communication system, a radio communication device, a radio communication method, and a program.

2. Description of the Related Art

A wireless LAN (Local Area Network) system as represented by IEEE (Institute of Electrical and Electronics Engineers) 802.11 is becoming increasingly common in place of a wired network for its advantages such as high flexibility of equipment. For example, as disclosed in Japanese Unexamined Patent Publication No. 2008-283590, the wireless LAN system standardized by the IEEE 802.11 is composed of groups of radio communication devices which are an access point operating as a master unit and a plurality of stations operating as slave units, and a plurality of stations are connected to one access point.

A use frequency in the wireless LAN system is typically set autonomously by a master unit or set by a user. Then, in the wireless LAN system standardized by the IEEE 802.11, a radio communication device that intends to make a new entry into the system detects a use frequency of a master unit and makes a connection with the master unit by the detected frequency, thereby forming a group of radio communication devices. Note that a radio communication device can detect the existence of the master unit and the use frequency of the master unit by sequentially sending probe requests using a plurality of available frequencies and receiving a probe response sent back as a response from the master unit.

SUMMARY OF THE INVENTION

However, the slave unit that is already connected to the master unit does not send the probe response back even when it receives the probe request from the radio communication device intending to make a new entry. Therefore, the radio communication device can grasp the existence of a slave unit belonging to the master unit and a communication function of the slave unit only after a connection is made with the master unit and data communication with the master unit becomes available. Thus, when a desired slave unit (e.g. a slave unit having a specific communication function) does not belong to the connected master unit, the radio communication device repeats a connection with another master unit in order to search for the desired slave unit. This results in problems such as an increase in the time necessary for the radio communication device to search for the desired slave unit and an increase in the load of the radio communication device.

In light of the foregoing, it is desirable to provide a novel and improved radio communication system, radio communication device, radio communication method, and program for finding a radio communication device operating as a slave unit without making a connection with a radio communication device operating as a master unit.

According to an embodiment of the present invention, there is provided a radio communication system including a first radio communication device, and a second radio communication device that communicates with a radio communication device operating as a master unit and being connected. The second radio communication device includes a communication unit that communicates with the radio communication device being connected, and a control unit that controls the communication unit to send a response packet to the first radio communication device when a response request packet broadcasted from the first radio communication device is received by the communication unit.

The first radio communication device may detect a packet sent from the radio communication device operating as the master unit and broadcasts the response request packet by using a frequency of the detected packet.

The response request packet may contain information indicating a communication function of the first radio communication device, and the control unit may control the communication unit to send the response packet when the communication function indicated by the information is available. Also, the response request packet may contain information indicating a communication function of the first radio communication device, and the control unit may control the communication unit to send the response packet regardless of whether the communication function indicated by the information is available.

The response packet may contain information indicating a communication function available for the second radio communication device.

The first radio communication device may perform connection processing with the radio communication device operating as the master unit and being connected with the second radio communication device based on reception of the response packet.

The first radio communication device may perform connection processing with the second radio communication device based on reception of the response packet.

The first radio communication device may make a connection with the second radio communication device by using a frequency different from a frequency used by the second radio communication device for communication with the radio communication device operating as the master unit. Also, the first radio communication device may make a connection with the second radio communication device by using a frequency used by the second radio communication device for communication with the radio communication device operating as the master unit.

According to another embodiment of the present invention, there is provided a radio communication device including a communication unit that communicates with a radio communication device operating as a master unit and being connected, and a control unit that, when a response request packet broadcasted from another radio communication device is received by the communication unit, controls the communication unit to send a response packet to said another radio communication device.

According to another embodiment of the present invention, there is provided a radio communication method including the steps of broadcasting a response request packet from a first radio communication device, receiving the response request packet by a second radio communication device that communicates with a radio communication device operating as a master unit and being connected, and sending a response packet from the second radio communication device to the first radio communication device.

According to another embodiment of the present invention, there is provided a program causing a computer to function as a radio communication device including a communication unit that communicates with a radio communication device operating as a master unit and being connected, and a control unit that, when a response request packet broadcasted from another radio communication device is received by the communication unit, controls the communication unit to send a response packet to said another radio communication device.

According to the embodiments of the present invention described above, it is possible to find a radio communication device operating as a slave unit without making a connection with a radio communication device operating as a master unit.

DETAILED DESCRIPTION OF THE EMBODIMENT(S)

Figure 1:
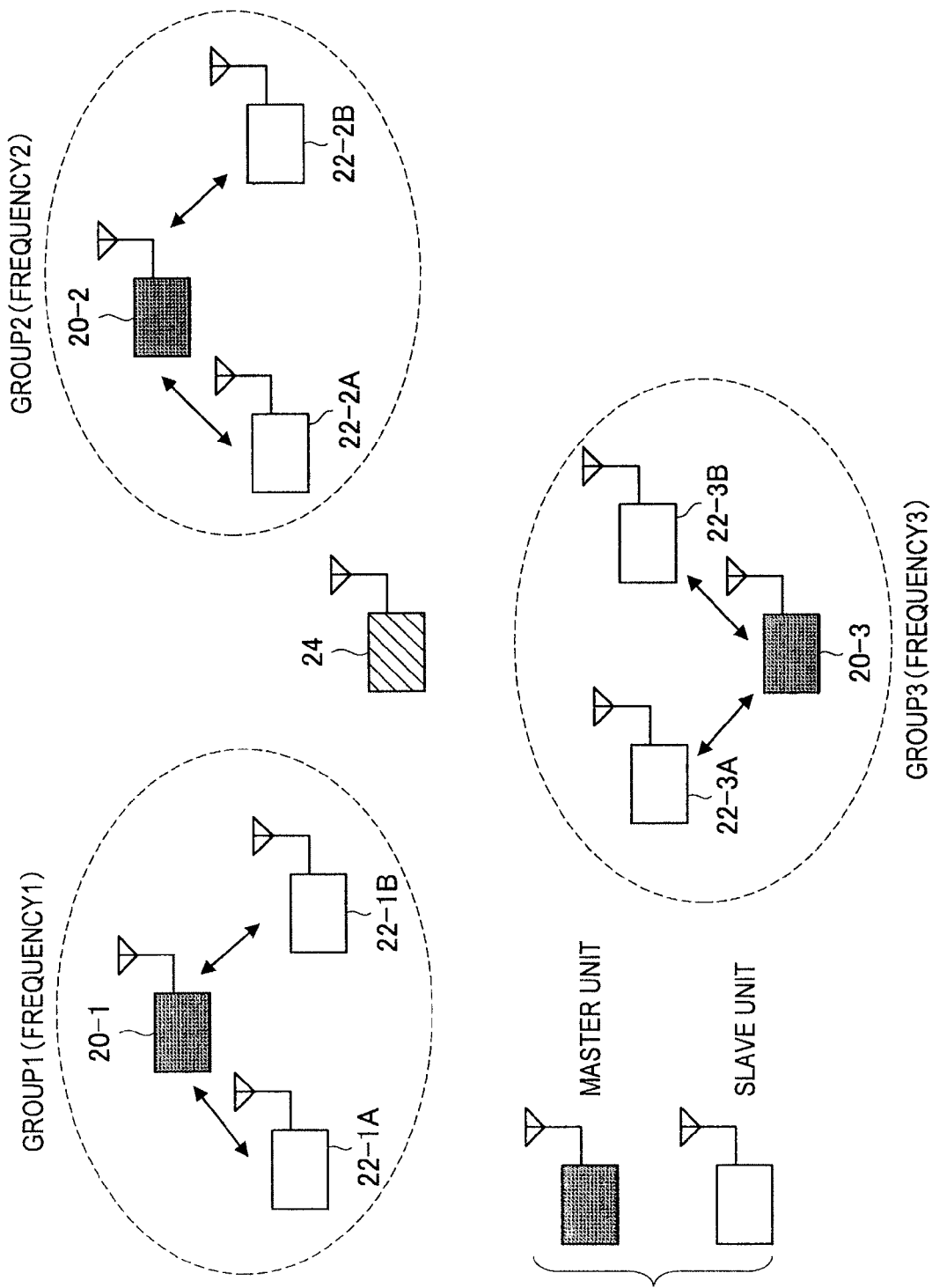
FIG. 1 is an explanatory view showing a configuration of a radio communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, each of a plurality of structural elements having substantially the same function is distinguished by affixing a different number with a hyphen to the same reference numeral in some cases. For example, a plurality of structural elements having substantially the same function are distinguished like a master unit 20-1, a master unit 20-2 and so on where necessary. However, when there is no particular need to distinguish between a plurality of structural elements having the same function, they are denoted by the same reference numeral. For example, when there is no particular need to distinguish between the master unit 20-1, the master unit 20-2 and so on, they are referred to simply as the master unit 20.

A preferred embodiment of the present invention will be described hereinafter in the following order.

1. Overall Configuration of Radio Communication System
2. Configuration of Radio Communication Device
3. Operation for Finding Slave Unit 3-1. First Operation Example
3-2. Second Operation Example
4. Summary An overall configuration of a radio communication system according to an embodiment of the present invention is described hereinafter with reference to FIG. 1.

FIG. 1 is an explanatory view showing a configuration of a radio communication system according to an embodiment of the present invention. Referring to FIG. 1, the radio communication system according to the embodiment of the present invention is composed of a plurality of groups of radio communication devices.

Specifically, a group 1 is composed of a master unit 20-1 and slave units (second radio communication devices) 22-1A and 22-1B being connected to the master unit 20-1. In the group 1, communication is managed by the master unit 20-1, and communication is performed using a frequency 1. Note that, in a system that decides a parentage when forming a connection group, it is determined that the master unit 20-1, though not being an access point, serves as a master unit and performs an operation as the access point such as beacon transmission, and the plurality of slave units 22 can be connected to the master unit 20-1 as shown in FIG. 1.

Further, a group 2 is composed of a master unit 20-2 and slave units 22-2A and 22-2B being connected to the master unit 20-2. In the group 2, communication is managed by the master unit 20-2, and communication is performed using a frequency 2, which is different from the group 1. Likewise, a group 3 is composed of a master unit 20-3 and slave units 22-3A and 22-3B being connected to the master unit 20-3. In the group 3, communication is managed by the master unit 20-3, and communication is performed using a frequency 3, which is different from the group 1 and the group 2.

Note that which radio communication device operates as the master unit 20 and which radio communication device operates as the slave unit 22 may be determined or not determined at the time of manufacturing each radio communication device. In the latter case, which radio communication device operates as the master unit 20 and which radio communication device operates as the slave unit 22 may be determined by negotiation among a plurality of radio communication devices.

Further, data transmitted between the master unit 20 and the slave unit 22 that belong to the same group may be music data such as music or radio program, video data such as movie, television program, video program, photograph, document, picture or chart, game data, software or the like.

Furthermore, the radio communication device such as the master unit 20 or the slave unit 22 may be an information processing device such as an access point, a PC (Personal Computer), a mobile phone, a portable music playback device, a home video processing device (e.g. a DVD recorder, a videocassette recorder etc.), a PDA (Personal Digital Assistants), a home game device, or an electrical household appliance, a portable video processing device or a portable game device.

The slave unit 22 that is already connected to the master unit 20 does not send a probe response back even when it receives a probe request. Therefore, as shown in FIG. 1, a radio communication device 24 (first radio communication device) that does not belong to any group and is searching for the slave unit 22 having a specific function or feature for connection makes a connection with any master unit 20 and thereby grasps the existence of the slave unit 22 that belongs to the master unit 20, for example.

Figure 2:
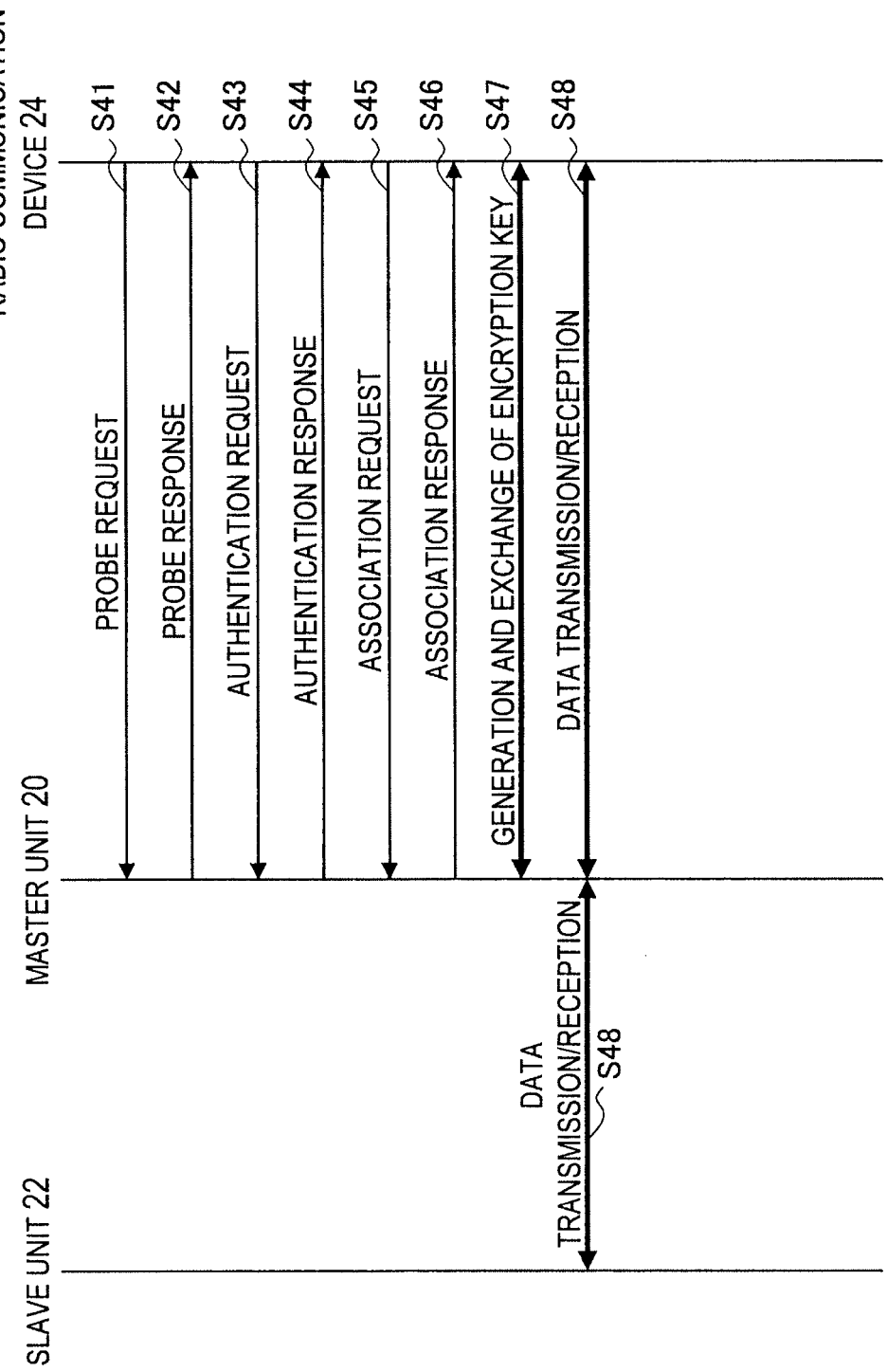
FIG. 2 is a sequence chart showing a connection process between a radio communication device and a master unit.

FIG. 2 is a sequence chart showing a connection process between the radio communication device 24 and the master unit 20. Referring to FIG. 2, the radio communication device 24 first sends a probe request to the master unit 20 (S41), and the master unit 20 sends a probe response back to the radio communication device 24 (S42). After that, in response to an authentication request from the radio communication device 24, the master unit 20 makes an authentication response (S43, S44), and, in response to an association request from the radio communication device 24, the master unit 20 makes an association response (S45, S46).

Then, after the radio communication device 24 and the master unit 20 generate and exchange an encryption key (S47), the radio communication device 24 and the master unit 20 become available for data communication. Therefore, the radio communication device 24 communicates with the slave unit 22 that belongs to the master unit 20 through the master unit 20 (S48) and thereby grasps the existence of the slave unit 22 and a communication function of the slave unit 22.

Figure 3:
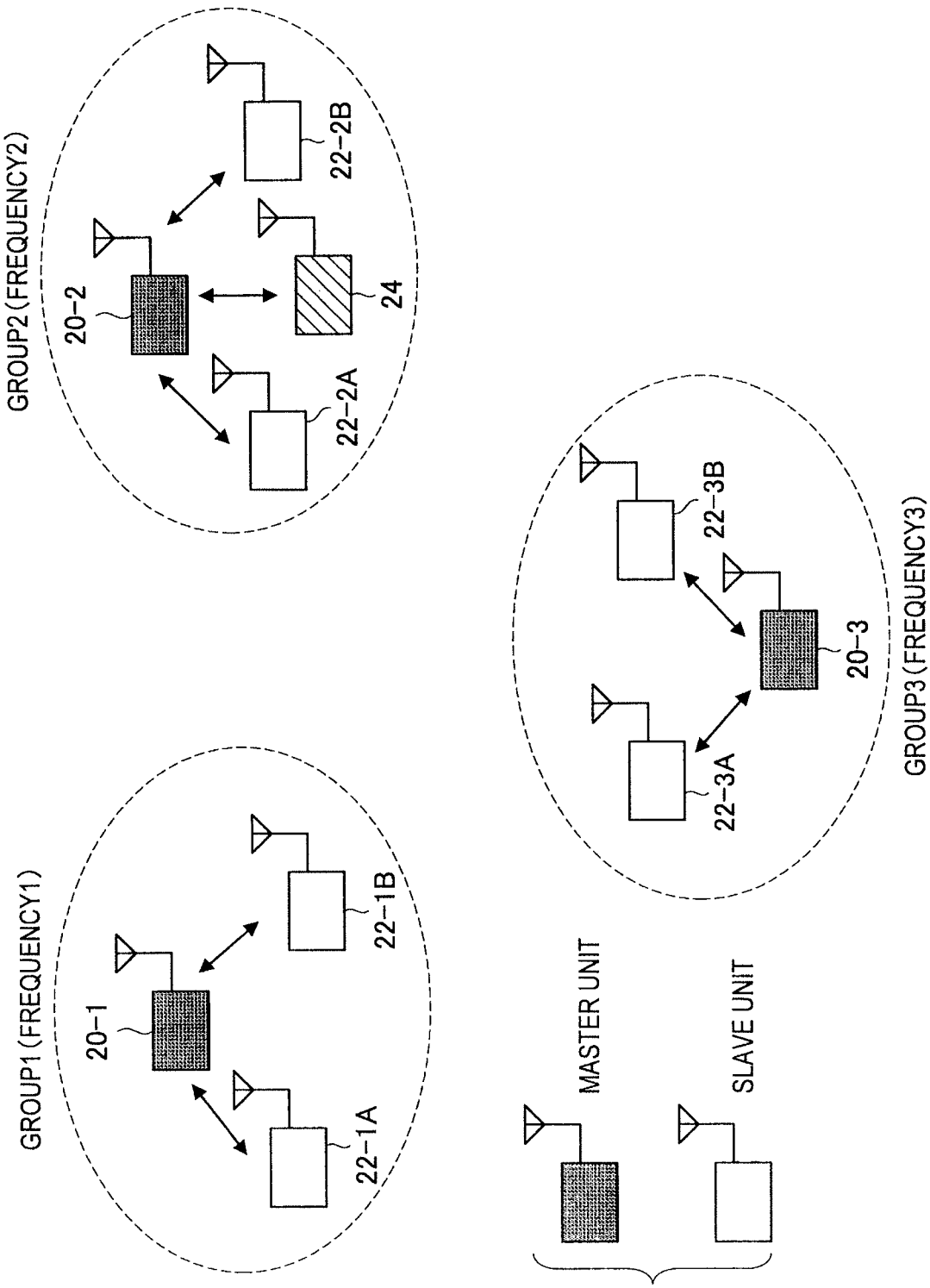
FIG. 3 is an explanatory view showing a connection example between a radio communication device and a master unit.

However, as shown in FIG. 3, when a slave unit having a communication function desired by the radio communication device 24 does not exist in the slave units 22-2 that belong to the master unit 20-2 to which the radio communication device 24 is connected, it is necessary to perform the connection process shown in FIG. 2 again with a different master unit 20. As a result, problems occurs such as an increase in the time necessary for the radio communication device 24 to search for the desired slave unit 22 and an increase in the load of the radio communication device 24.

Given such circumstances, an embodiment of the present invention has been invented. According to the embodiment, the radio communication device 24 can find the slave unit 22 without making a connection with the master unit 20. The embodiment is described hereinafter in detail.

<2. Configuration of Radio Communication Device>

Figure 4:
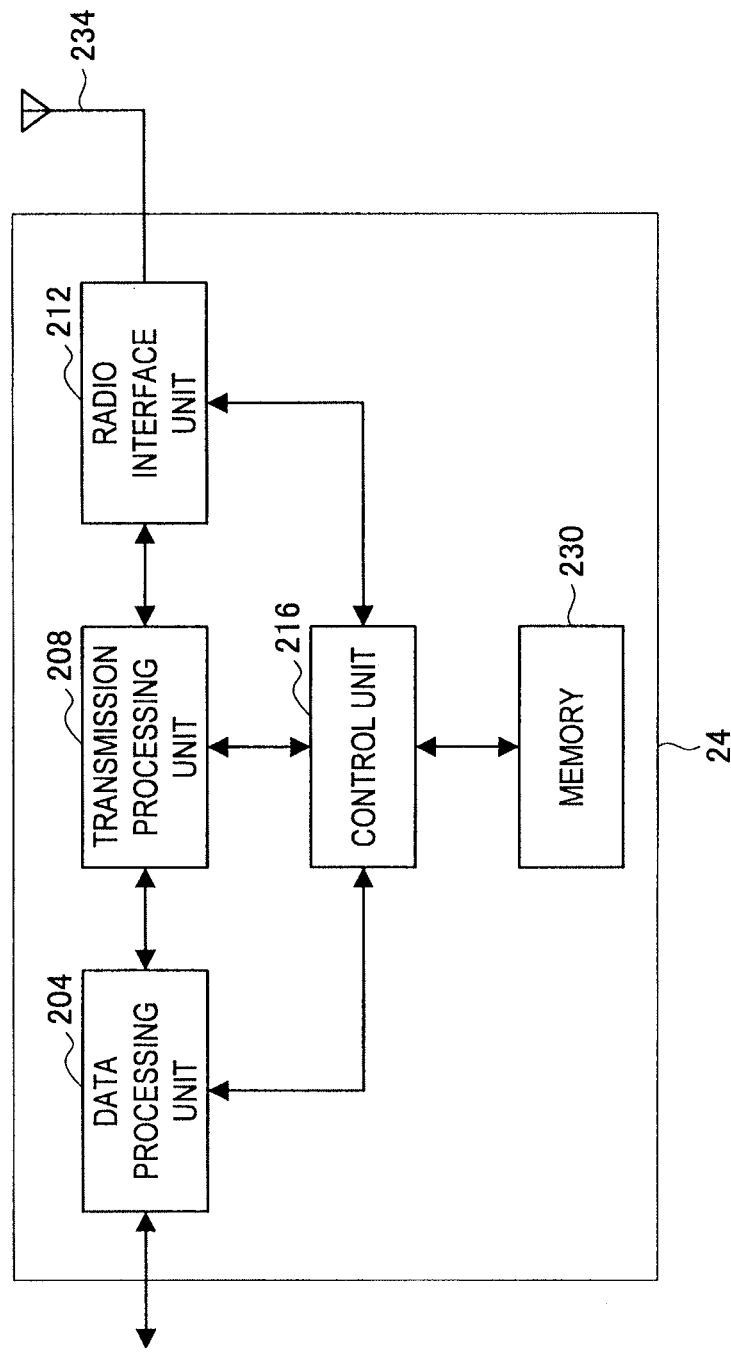
FIG. 4 is a functional block diagram showing a configuration of a radio communication device according to the embodiment.

FIG. 4 is a functional block diagram showing a configuration of the radio communication device 24 according to the embodiment. Note that the slave unit 22 and the master unit 20 may be configured in substantially the same manner as the radio communication device 24 shown in FIG. 4, and detailed explanation of configurations of the slave unit 22 and the master unit 20 is omitted.

Referring to FIG. 4, the radio communication device 24 includes a data processing unit 204, a transmission processing unit 208, a radio interface unit 212, a control unit 216, a memory 230, and an antenna 234.

In a transmitting operation, the data processing unit 204 creates various data frames and data packets in response to a request from an upper layer, for example, and supplies them to the transmission processing unit 208. The transmission processing unit 208 performs, during transmission, processing such as addition of various data headers or an error detecting code such as FCS (Frame Check Sequence) to the packets created by the data processing unit 204 and then provides the processed data to the radio interface unit 212. The radio interface unit 212 generates a modulation signal in a frequency band of a carrier wave from the data received from the transmission processing unit 208 and transmits the signal as a radio signal from the antenna 234.

Further, in a receiving operation, the radio interface unit 212 performs down-conversion of a radio signal received by the antenna 234 and converts the signal into a bit string to thereby decode various data frames. The transmission processing unit 208 analyzes headers added to the various data frames supplied from the radio interface unit 212 and, confirming that there is no error in the data frames based on the error detecting code, supplies the various data frames to the data processing unit 204. The data processing unit 204 processes and analyzes the various data frames and data packets supplied from the transmission processing unit 208. In this manner, the data processing unit 204, the transmission processing unit 208, the radio interface unit 212 and the antenna 234 function as a communication unit.

The control unit 216 controls the receiving operation and the transmitting operation of the data processing unit 204, the transmission processing unit 208, and the radio interface unit 212. For example, the control unit 216 performs operations such as determination of a use frequency, instruction for creation or transmission of control messages (annunciation information such as a beacon, an acknowledgement of a beacon, a probe request and a probe response) and interpretation of control messages.

The memory 230 has a role of a working area of data processing by the control unit 216 and a function of a storage medium that stores various kinds of data. The memory 230 may be a storage medium such as nonvolatile memory, a magnetic disk, an optical disc or an MO (Magneto Optical) disk. Examples of the nonvolatile memory are EEPROM (Electrically Erasable Programmable Read-Only Memory), EPROM (Erasable Programmable ROM) and so on. Examples of the magnetic disk are a hard disk, a discoid magnetic disk and so on. Examples of the optical disc are CD (Compact Disc), DVD-R (Digital Versatile Disc Recordable), BD (Blu-ray Disc®) and so on.

<3. Operation for Finding Slave Unit>

The configuration of the radio communication device 24 is described above with reference to FIG. 4. Hereinafter, a first operation example and a second operation example for the radio communication device 24 to find the slave unit 22 that is already connected to the master unit 20 are described sequentially.

(3-1. First Operation Example)

Figure 5:
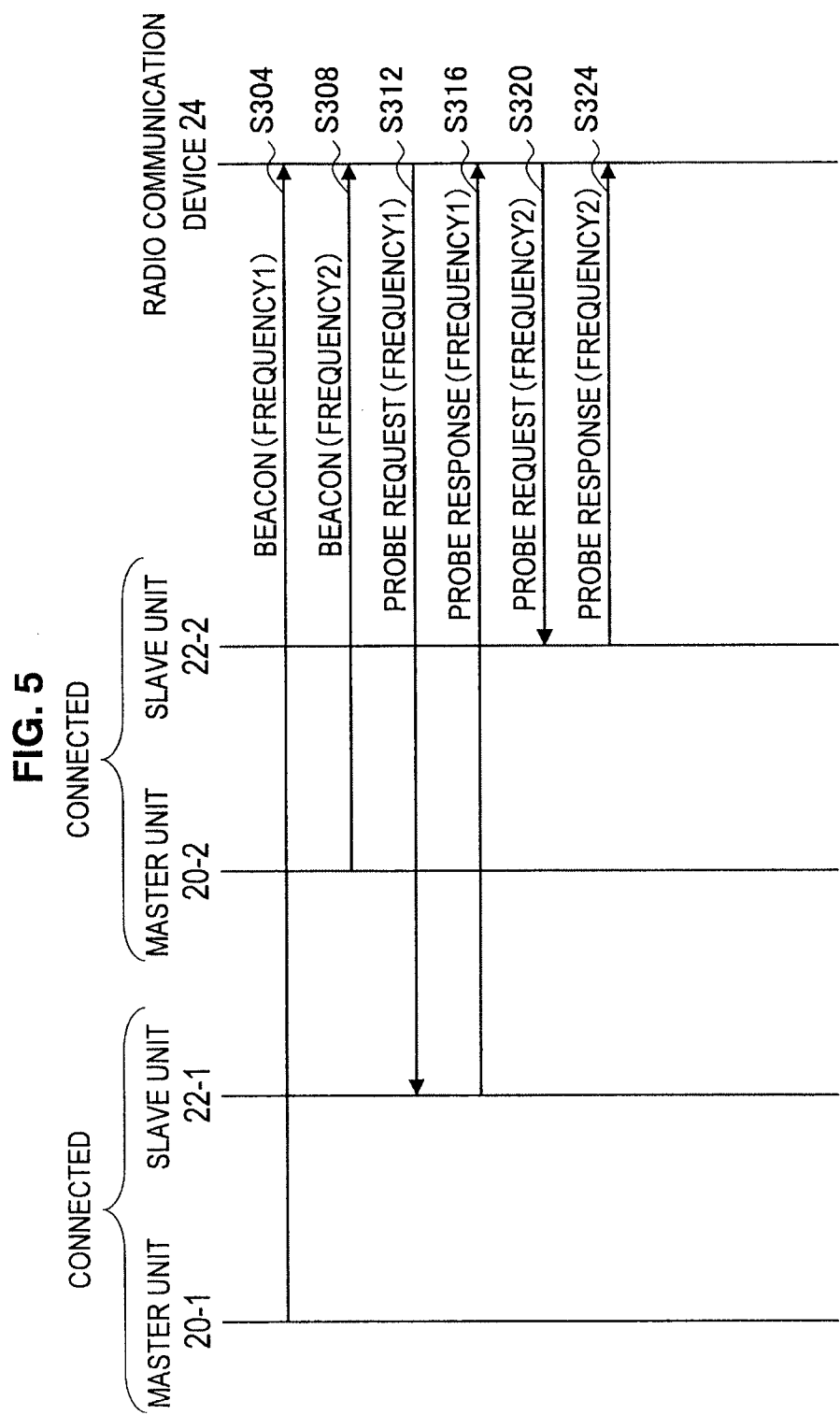
FIG. 5 is a sequence chart showing a first operation example for a radio communication device to find a slave unit.

FIG. 5 is a sequence chart showing the first operation example for the radio communication device 24 to find a slave unit. Referring to FIG. 5, the master unit 20-1 and the slave unit 22-1 are being connected, and the master unit 20-2 and the slave unit 22-2 are being connected. In such a connection relationship, the master unit 20-1 sends a beacon as a broadcast packet by using the frequency 1 (S304), and the master unit 20-2 sends a beacon by using the frequency 2 (S308).

Therefore, the radio communication device 24 can receive the beacon sent using the frequency 1 from the master unit 20-1 and the beacon sent using the frequency 2 from the master unit 20-2 by performing reception processing, changing the use frequency by turns. Further, the radio communication device 24 can recognize the master unit 20-1 using the frequency 1 and the master unit 20-2 using the frequency 2 by receiving the beacons. Furthermore, the radio communication device 24 can conjecture the existence of the slave unit 22-1 belongs to the master unit 20-1 and using the frequency 1 and the existence of the slave unit 22-2 belongs to the master unit 20-2 and using the frequency 2.

Thus, the radio communication device 24 sends a probe request packet (response request packet) by using the frequency 1 of the beacon received in S304 (S312). In this step, the radio communication device 24 may broadcast the probe request packet or send it by designating a specific address. Because the slave unit 22-1 using the frequency 1 can receive the probe request packet which is sent using the frequency 1 from the radio communication device 24, the slave unit 22-1 sends a probe response packet containing information indicating a communication function of the slave unit 22-1 to the radio communication device 24 (S316). The probe response packet (response packet) is described hereinafter with reference to FIG. 6.

Figure 6:
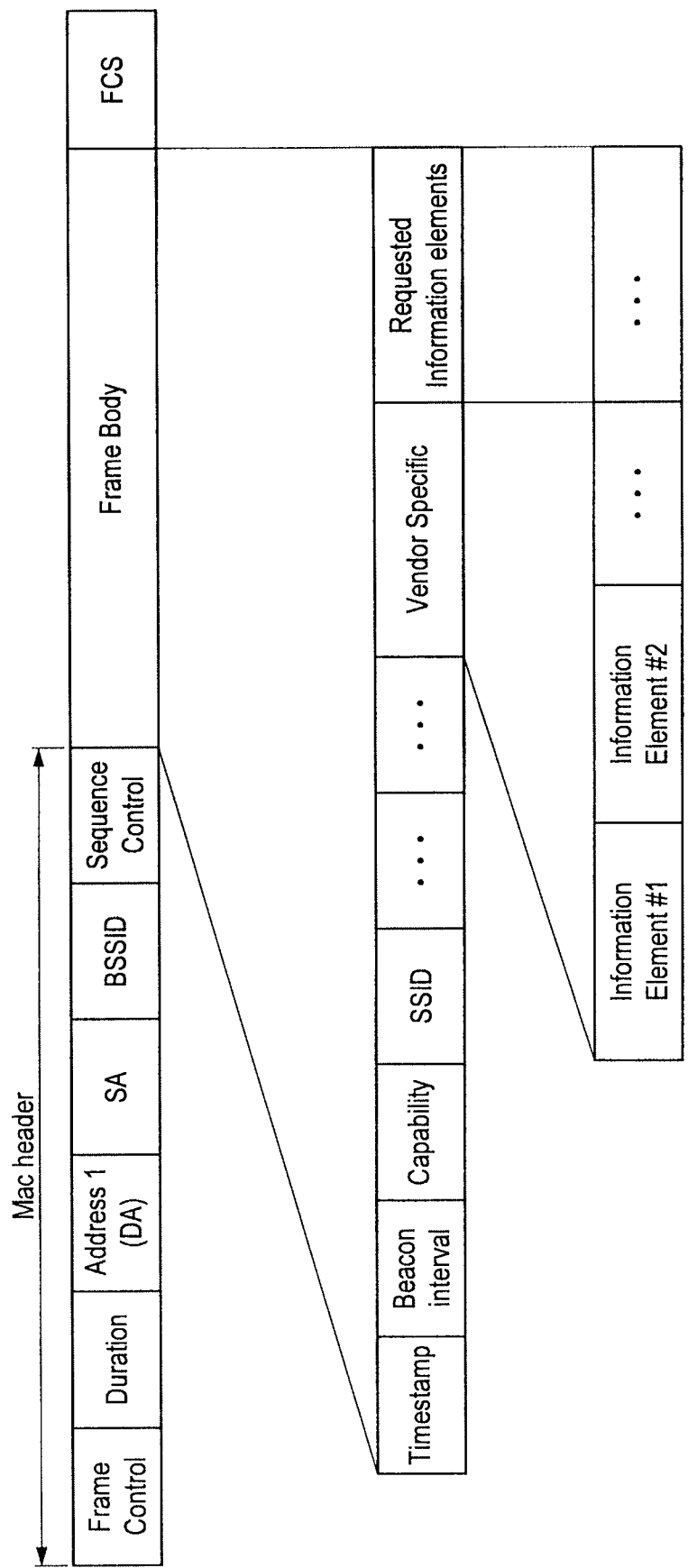
FIG. 6 is an explanatory view showing an exemplary structure of a probe response packet.

FIG. 6 is an explanatory view showing an exemplary structure of the probe response packet. As shown in FIG. 6, the probe response packet is composed of Mac Header, Frame Body, and FCS. The Mac Header is composed of Frame Control, Duration, Address 1 (DA), SA, BSSID, and Sequence Control. The address of the radio communication device 24 is described in the Address 1 (DA).

Further, Frame Body contains Vendor Specific, and the slave unit 22-1 provides description of information (Information Element #1, #2 . . . ) indicating a communication function of the slave unit 22-1 in the Vendor Specific. For example, the information indicating a communication function may be Wi-Fi Protected setup information element which is standardized in Wi-Fi Alliance.

Referring back to FIG. 5, the sequence is further described below. The radio communication device 24 sends a probe request packet by using the frequency 2 of the beacon received in S308 (S320). Because the slave unit 22-2 using the frequency 2 can receive the probe request packet which is sent using the frequency 2 from the radio communication device 24, the slave unit 22-2 sends a probe response packet containing information indicating a communication function of the slave unit 22-2 to the radio communication device 24 (S324).

As described above, by receiving the probe response packet from the slave unit 22 which has received the probe request packet, the radio communication device 24 can find the existence of the slave unit 22 and recognize the communication function of the slave unit 22. The radio communication device 24 can thereby issue a connection request to the master unit 20 to which the slave unit 22 belongs or issue a connection request directly to the slave unit 22 in order to make a connection with the desired slave unit 22.

Note that, when the radio communication device 24 is directly connected to the slave unit 22, a group composed of the radio communication device 24 and the slave unit 22 is formed, and an operational frequency of the group may be different from or the same as the frequency which is used by the slave unit 22 for communication with the master unit 20.

Further, the radio communication device 24 may hold a list indicating the recognized slave units 22 and their communication functions and update the list by performing the process shown in FIG. 5 at regular intervals. Alternatively, the radio communication device 24 may update the list by performing the process shown in FIG. 5 when necessary. As a management method of the list, an effective way is used according to the rate of change over time of the radio communication system.

Figure 7:
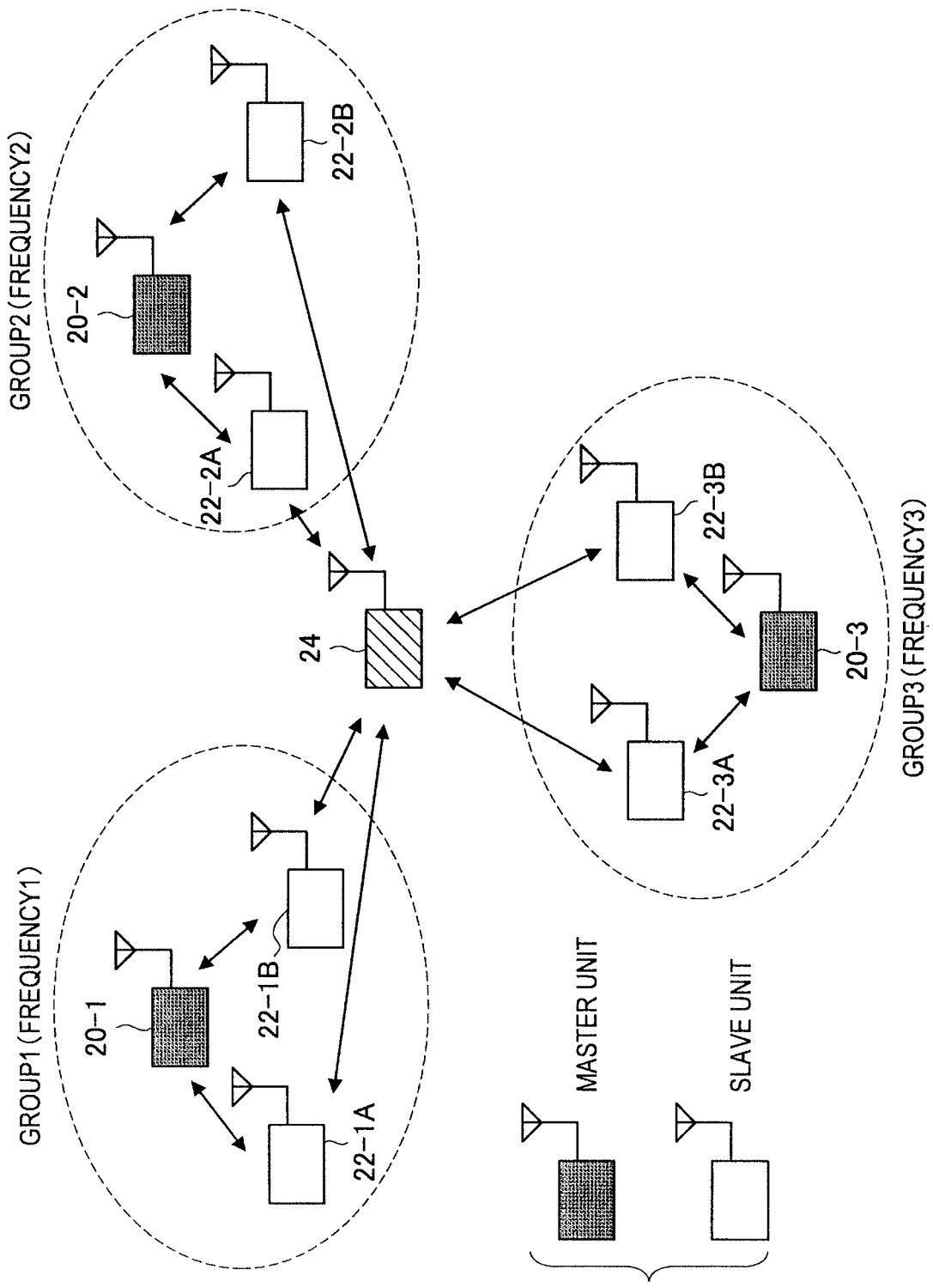
FIG. 7 is an explanatory view showing communication between a radio communication device and a slave unit in the first operation example.

Further, although only some of the slave units 22 are shown in FIG. 5, probe request packets and probe response packets are sent and received between a large number of slave units 22 and the radio communication device 24 according to the first operation example as shown in FIG. 7.

(3-2. Second Operation Example)

Figure 8:
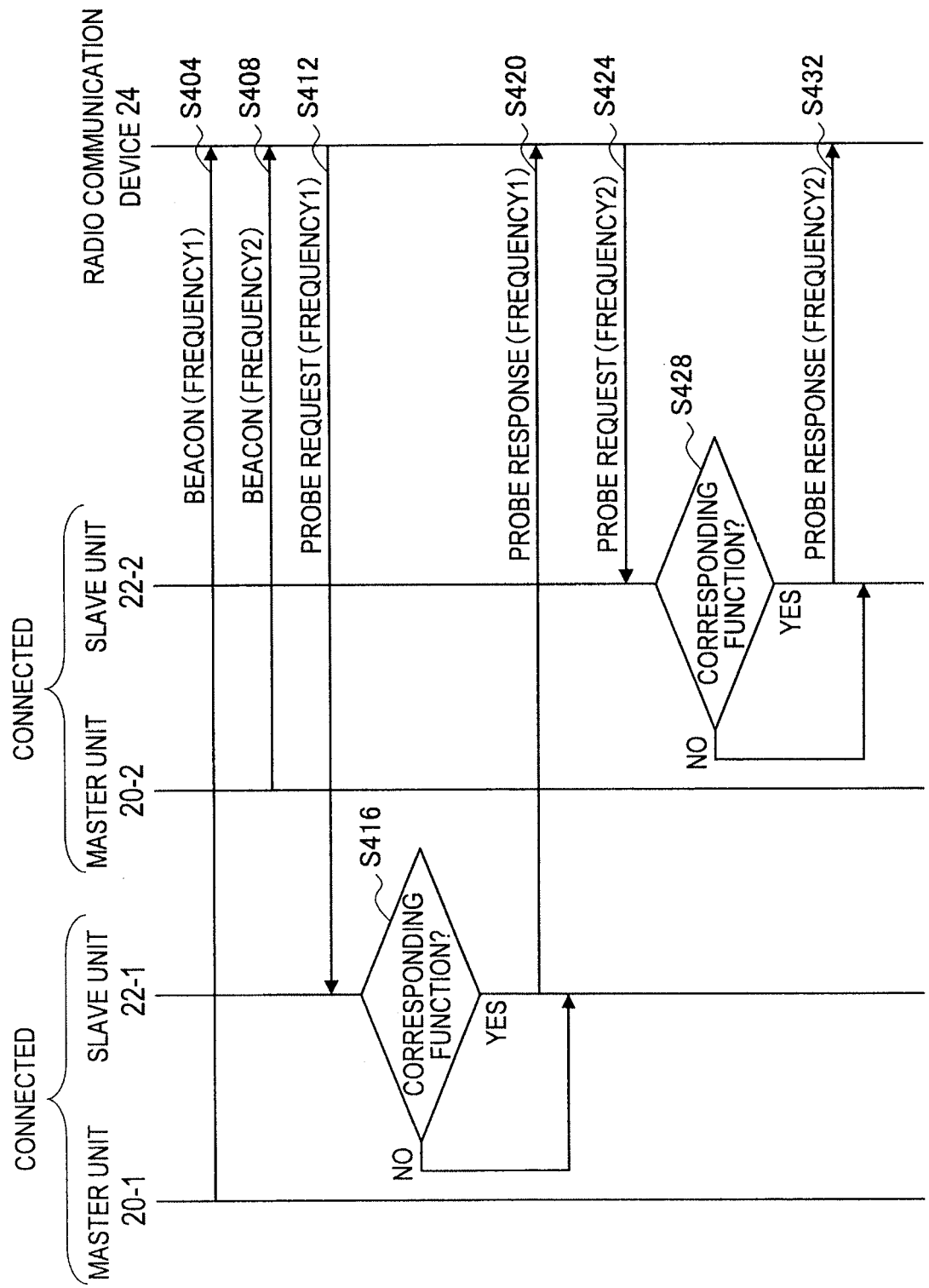
FIG. 8 is a sequence chart showing a second operation example for a radio communication device to find a slave unit.

FIG. 8 is a sequence chart showing the second operation example for the radio communication device 24 to find a slave unit. Referring to FIG. 8, the master unit 20-1 and the slave unit 22-1 are being connected, and the master unit 20-2 and the slave unit 22-2 are being connected. In such a connection relationship, the master unit 20-1 sends a beacon as a broadcast packet by using the frequency 1 (S404), and the master unit 20-2 sends a beacon by using the frequency 2 (S408).

Therefore, the radio communication device 24 can receive the beacon sent using the frequency 1 from the master unit 20-1 and the beacon sent using the frequency 2 from the master unit 20-2 by performing reception processing, changing the use frequency by turns. Further, the radio communication device 24 can recognize the master unit 20-1 using the frequency 1 and the master unit 20-2 using the frequency 2 by receiving the beacons. Furthermore, the radio communication device 24 can conjecture the existence of the slave unit 22-1 belongs to the master unit 20-1 and using the frequency 1 and the existence of the slave unit 22-2 belongs to the master unit 20-2 and using the frequency 2.

Thus, the radio communication device 24 sends a probe request packet containing information indicating a feature of the radio communication device 24 by using the frequency 1 of the beacon received in S404 (S412). An exemplary structure of the probe request packet is described hereinafter with reference to FIG. 9.

Figure 9:
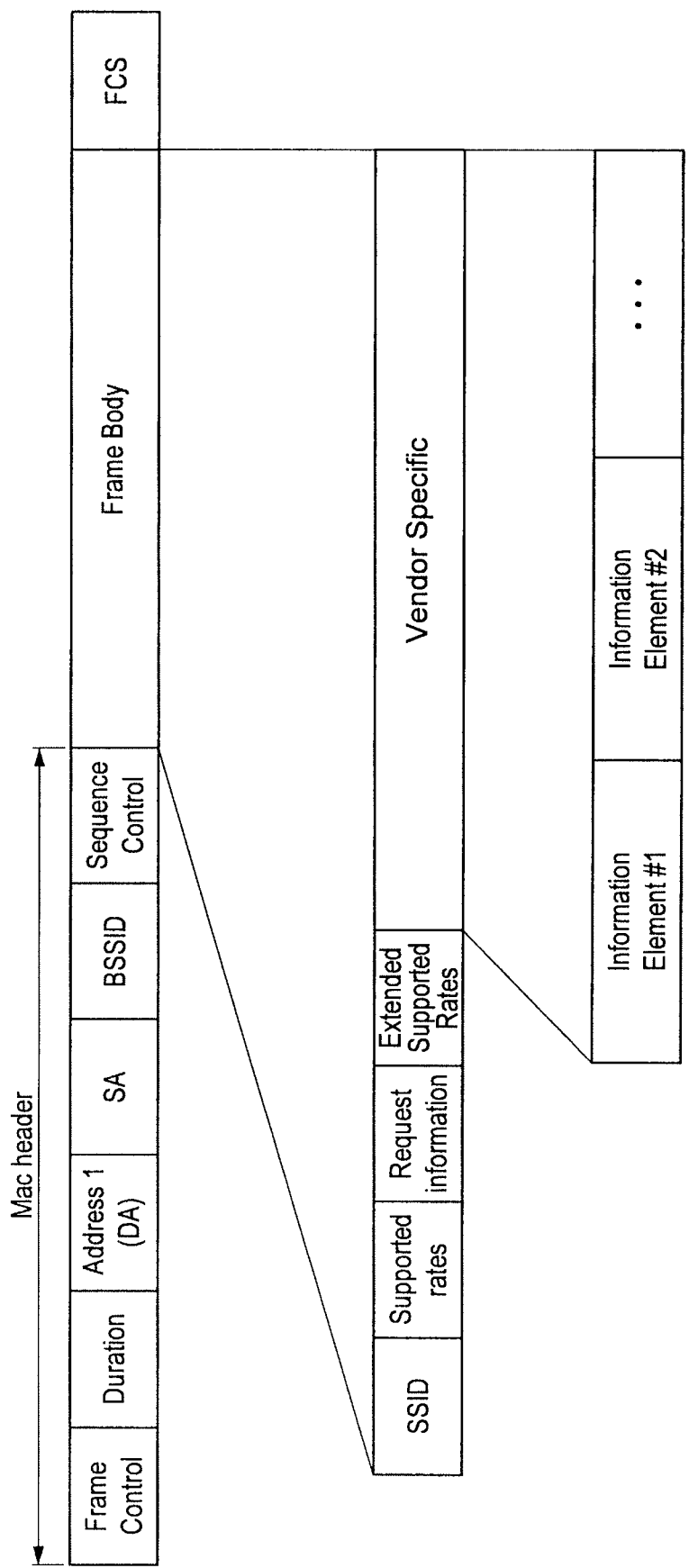
FIG. 9 is an explanatory view showing an exemplary structure of a probe request packet.

FIG. 9 is an explanatory view showing an exemplary structure of a probe request packet. As shown in FIG. 9, the probe request packet is composed of Mac Header, Frame Body, and FCS. The Mac Header is composed of Frame Control, Duration, Address 1 (DA), SA, BSSID, and Sequence Control. In the Address 1 (DA), a broadcast address or, when the other end of communication desired is specified, the address of the other end of communication are described.

Further, Frame Body contains Vendor Specific, and the radio communication device 24 provides description of information (Information Element #1, #2 . . . ) indicating a communication function of the radio communication device 24 in the Vendor Specific. For example, the information indicating a communication function may be Wi-Fi Protected setup information element which is standardized in Wi-Fi Alliance.

Referring back to FIG. 8, the sequence is further described below. The slave unit 22-1 using the frequency 1 receives the probe request packet sent using the frequency 1 from the radio communication device 24. Then, the slave unit 22-1 refers to the probe request packet and determines whether it is compatible with the communication function of the radio communication device 24 (S416), and only when it is compatible, the slave unit 22-1 sends a probe response packet to the radio communication device 24 (S420).

Likewise, the radio communication device 24 sends a probe request packet containing information indicating a communication function of the radio communication device 24 or a desired communication function for execution by using the frequency 2 of the beacon received in S408 (S424).

The slave unit 22-2 using the frequency 2 receives the probe request packet sent using the frequency 2 from the radio communication device 24 and determines whether it is compatible with the communication function which is indicated by the information contained in the probe request packet (S428). Then, only when the slave unit 22-2 is compatible with the communication function which is indicated by the information contained in the probe request packet, the slave unit 22-2 sends a probe response packet to the radio communication device 24 (S432).

Figure 10:
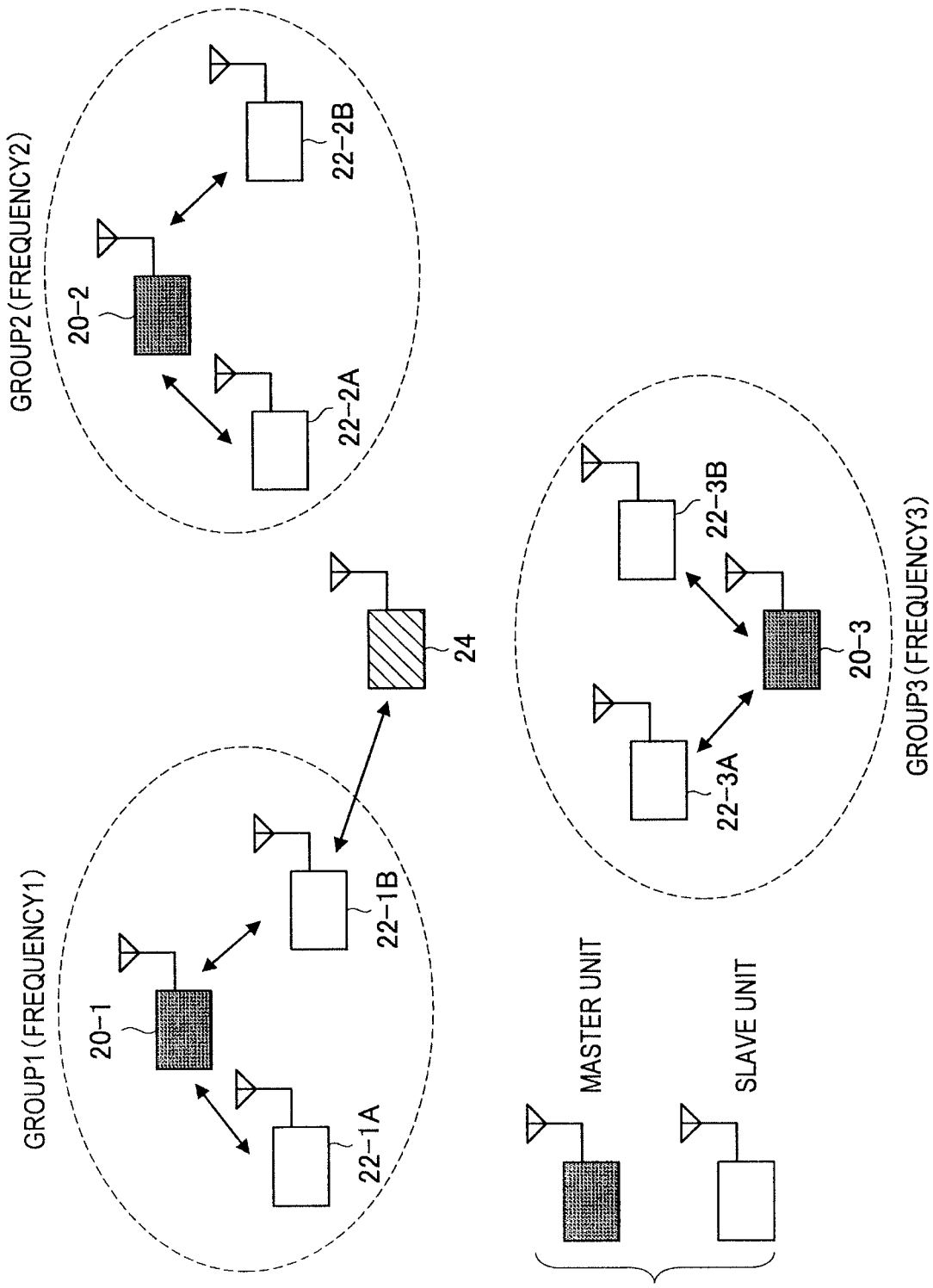
FIG. 10 is an explanatory view showing communication between a radio communication device and a slave unit in the second operation example.

As described above, according to the second operation example, the radio communication device 24 receives the probe response packet only from the slave unit 22-1B having a specific communication function, for example, not from unspecified slave units 22, as shown in FIG. 10. The radio communication device 24 can thereby issue a connection request to the master unit 20-1 to which the slave unit 22-1B belongs or issue a connection request directly to the slave unit 22-1B in order to make a connection with the slave unit 22-1B.

<4. Summary>

As described in the foregoing, according to the embodiment, even the slave unit 22 being connected to the master unit 20 sends the probe response packet when it receives the probe request packet. Therefore, the radio communication device 24 can find the existence of the slave unit 22 by sending the probe request packet. It is thus not necessary for the radio communication device 24 to make a connection with the master unit 20 in order to find the slave unit 22, thereby reducing the time and processing needed to find the slave unit 22.

Further, according to the embodiment, because information indicating a function of a transmission source device is described in the probe request packet and the probe, response packet, the radio communication device 24 can recognize the function of the found slave unit 22.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, although the case where information indicating a communication function is described in the probe request packet and the probe response packet is described above, the embodiment is not limited thereto. As an alternative example, an application, an information throughput capacity, a remaining power or the like of a transmission source device may be described in the probe request packet and the probe response packet.

Further, it is not always necessary to perform the steps in the processing of the radio communication system of the specification in chronological order according to the sequence shown in sequence charts. For example, the steps in the processing of the radio communication system may be processed in a different sequence from the sequence shown in sequence charts or may be processed in parallel.

For example, although the case where the radio communication device 24 sends the probe request after scanning beacons by all operable frequencies as shown in FIGS. 5 and 8 is described above, the embodiment is not limited thereto. As an alternative example, upon receiving a beacon with a certain frequency, the radio communication device 24 may send the probe request by the certain frequency.

Figure 11:
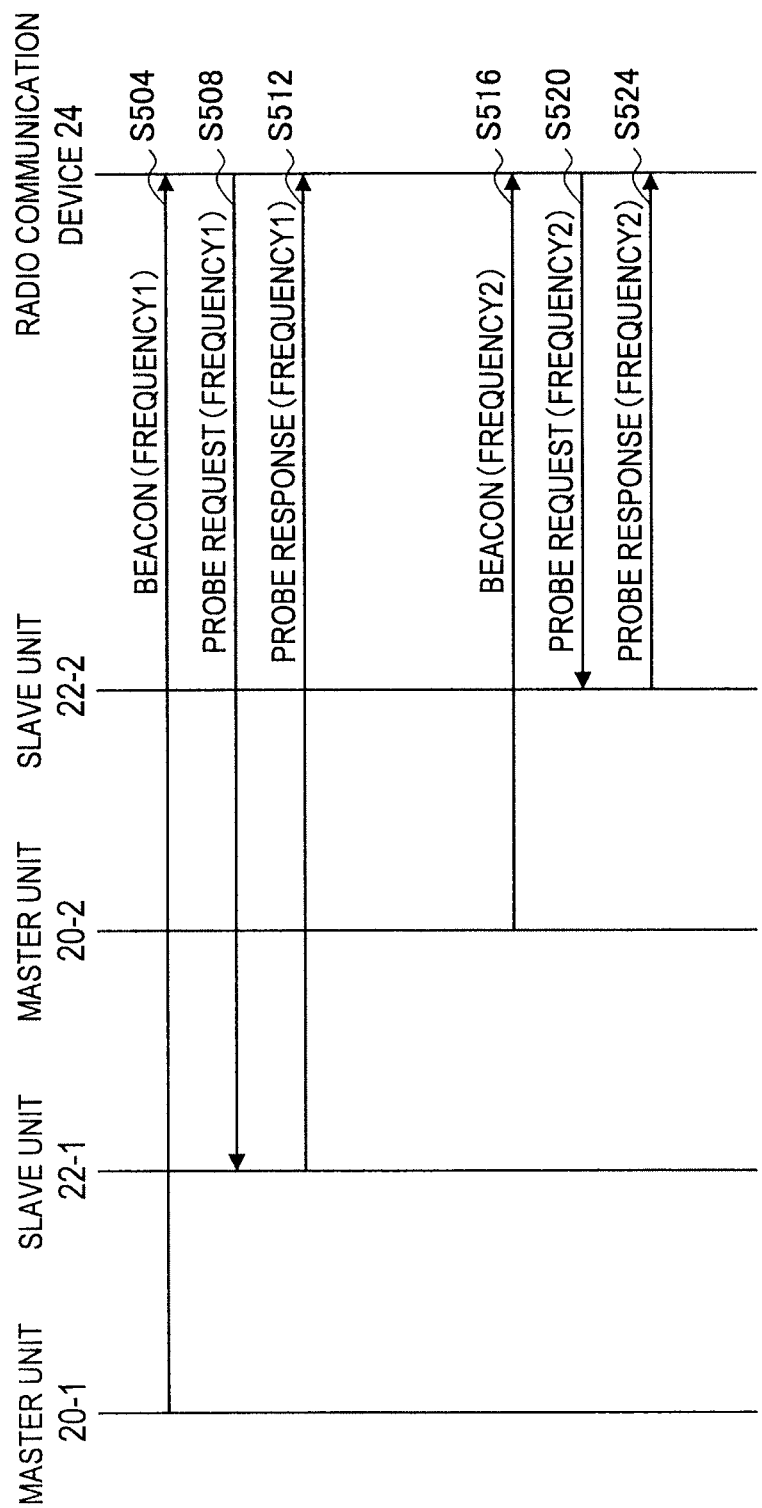
FIG. 11 is a sequence chart showing an alternative example of the first operation example.

FIG. 11 is an explanatory view showing an alternative example of the first operation example of the radio communication device 24. Referring to FIG. 11, when the radio communication device 24 receives a beacon sent using the frequency 1 from the master unit 20-1 (S504), the radio communication device 24 sends a probe request packet (response request packet) by using the frequency 1 (S508). Because the slave unit 22-1 using the frequency 1 can receive the probe request packet which is sent using the frequency 1 from the radio communication device 24, the slave unit 22-1 sends a probe response packet containing information indicating a communication function of the slave unit 22-1 to the radio communication device 24 (S512). Although not shown in FIG. 11, the master unit 20-1 also sends a probe response packet in response to the probe request packet sent in S508.

Likewise, when the radio communication device 24 receives a beacon sent using the frequency 2 from the master unit 20-2 (S516), the radio communication device 24 sends a probe request packet (response request packet) by using the frequency 2 (S520). Because the slave unit 22-2 using the frequency 2 can receive the probe request packet which is sent using the frequency 2 from the radio communication device 24, the slave unit 22-2 sends a probe response packet containing information indicating a communication function of the slave unit 22-2 to the radio communication device 24 (S524).

Note that, although not shown in FIG. 11, the master unit 20-2 also sends a probe response packet in response to the probe request packet sent in S520.

Figure 12:
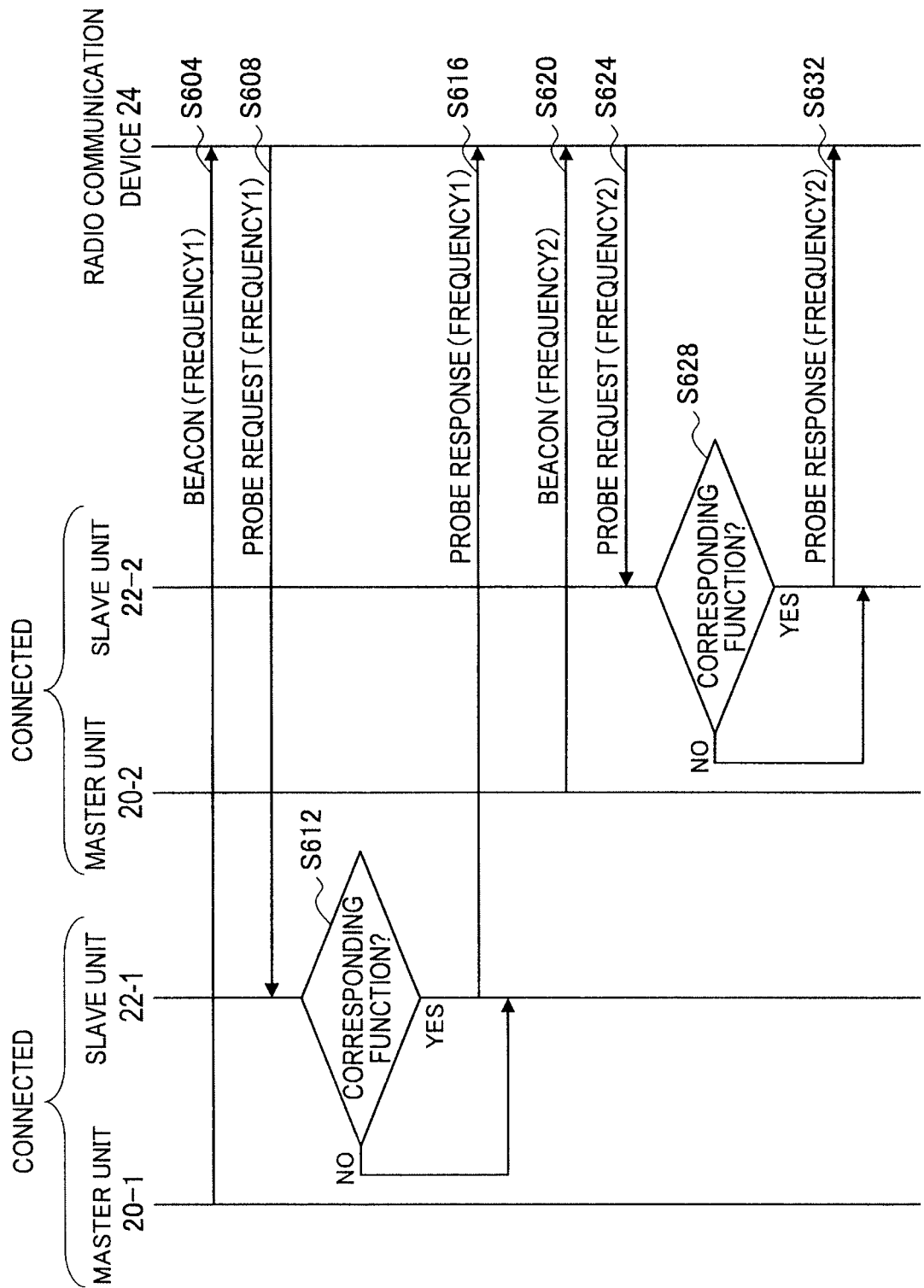
FIG. 12 is a sequence chart showing an alternative example of the second operation example.

FIG. 12 is an explanatory view showing an alternative example of the second operation example of the radio communication device 24. Referring to FIG. 12, when the radio communication device 24 receives a beacon sent using the frequency 1 from the master unit 20-1 (S604), the radio communication device 24 sends a probe request packet (response request packet) by using the frequency 1 (S608). The slave unit 22-1 using the frequency 1 receives the probe request packet which is sent using the frequency 1 from the radio communication device 24 and determines whether it is compatible with the communication function of the radio communication device 24 which is indicated by the probe request packet (S612). Then, only when the slave unit 22-1 is compatible with the communication function of the radio communication device 24, the slave unit 22-1 sends a probe response packet to the radio communication device 24 (S616). Note that, although not shown in FIG. 12, the master unit 20-1 also sends a probe response packet in response to the probe request packet sent in S608.

Likewise, when the radio communication device 24 receives a beacon sent using the frequency 2 from the master unit 20-2 (S620), the radio communication device 24 sends a probe request packet (response request packet) by using the frequency 2 (S624). The slave unit 22-2 using the frequency 2 receives the probe request packet which is sent using the frequency 2 from the radio communication device 24 and determines whether it is compatible with the communication function of the radio communication device 24 which is indicated by the probe request packet (S628). Then, only when the slave unit 22-2 is compatible with the communication function of the radio communication device 24, the slave unit 22-2 sends a probe response packet to the radio communication device 24 (S632). Note that, although not shown in FIG. 12, the master unit 20-2 also sends a probe response packet in response to the probe request packet sent in S624.

Furthermore, it is possible to create a computer program that causes hardware such as a CPU, ROM and RAM incorporated in the master unit 20, the slave unit 22 and the radio communication device 24 to perform the equal functions to the elements of the master unit 20, the slave unit 22 and the radio communication device 24 described above. Further, a storage medium that stores such a computer program may be provided.

The present application contains subject matter related to that disclosed in Japanese Priority Patent Application JP 2009-260294 filed in the Japan Patent Office on Nov. 13, 2009, the entire content of which is hereby incorporated by reference.

What is claimed is:

1. A radio communication system comprising:
    a first radio communication device,
        wherein the first radio communication device continuous detects a plurality of beacon packets broadcast on different frequencies by a plurality of radio communication devices operating as master units, and
        wherein the first radio communication device broadcasts a plurality of response request packets on the frequencies of detected beacon packets;
    a second radio communication device that communicates with one of the plurality of radio communication devices operating as master units and being connected,
    the second radio communication device comprising:
        a communication unit that communicates with the radio communication device being connected, and a control unit that controls the communication unit to send a response packet to the first radio communication device when a response request packet broadcasted from the first radio communication device is received by the communication unit.

2. The radio communication system according to claim 1, wherein
the first radio communication device detects a packet sent from the radio communication device operating as the master unit and broadcasts the response request packet by using a frequency of the detected packet.

3. The radio communication system according to claim 2, wherein
the response request packet contains information indicating a communication function of the first radio communication device, and
the control unit controls the communication unit to send the response packet when the communication function indicated by the information is available.

4. The radio communication system according to claim 3, wherein
the first radio communication device performs connection processing with the radio communication device operating as the master unit and being connected with the second radio communication device based on reception of the response packet.

5. The radio communication system according to claim 3, wherein
the first radio communication device performs connection processing with the second radio communication device based on reception of the response packet.

6. The radio communication system according to claim 5, wherein
the first radio communication device makes a connection with the second radio communication device by using a frequency different from a frequency used by the second radio communication device for communication with the radio communication device operating as the master unit.

7. The radio communication system according to claim 5, wherein
the first radio communication device makes a connection with the second radio communication device by using a frequency used by the second radio communication device for communication with the radio communication device operating as the master unit.

8. The radio communication system according to claim 2, wherein
the response request packet contains information indicating a communication function of the first radio communication device, and
the control unit controls the communication unit to send the response packet regardless of whether the communication function indicated by the information is available.

9. The radio communication system according to claim 2, wherein
the response packet contains information indicating a communication function available for the second radio communication device.

10. The radio communication system according to claim 9, wherein
the first radio communication device performs connection processing with the radio communication device operating as the master unit and being connected with the second radio communication device based on reception of the response packet.

11. The radio communication system according to claim 9, wherein
the first radio communication device performs connection processing with the second radio communication device based on reception of the response packet.

12. A radio communication device comprising:
a communications unit continuously detecting a plurality of beacon packets broadcast on different frequencies by a plurality of radio communications devices operating as master units;
a control unit broadcasting a plurality of response request packets on the frequencies of detected beacon packets;
a communications unit receiving a response packet on one of the frequencies of detected beacon packets from a radio communications device different than the radio communications devices operating as master units; and
a processing unit determining the existence and a communication function of a radio communications device connected to the radio communications device operating as a master unit on the frequency of the received response packet.

13. A radio communication method comprising the steps of:
continuously detecting a plurality of beacon packets broadcast on different frequencies by a plurality of radio communications devices operating as master units;
broadcasting a plurality of response request packets on the frequencies of detected beacon packets;
receiving a response packet on one of the frequencies of detected beacon packets from a radio communications device different than the radio communications devices operating as master units; and
determining the existence and a communication function of a radio communications device connected to the radio communications device operating as a master unit on the frequency of the received response packet.

14. A computer readable storage medium, comprising instructions that, when executed by a processor, causes the processor to perform a radio communication method, comprising the steps of;
continuously detecting a plurality of beacon packets broadcast on different frequencies by a plurality of radio communications devices operating as master units;
broadcasting a plurality of response request packets on the frequencies of detected beacon packets;
receiving a response packet on one of the frequencies of detected beacon packets from a radio communications device different than the radio communications devices operating as master units; and
determining the existence and a communication function of a radio communications device connected to the radio communications device operating as a master unit on the frequency of the received response packet.

* * * * *